C. A. BEHLEN.
COUPLING AND DRAW BAR FOR AUTOMOBILES.
APPLICATION FILED JAN. 17, 1918.

1,313,451.

Patented Aug. 19, 1919.
3 SHEETS—SHEET 1.

Inventor
Charles A. Behlen,
By F. E. Stebbins,
Attorney

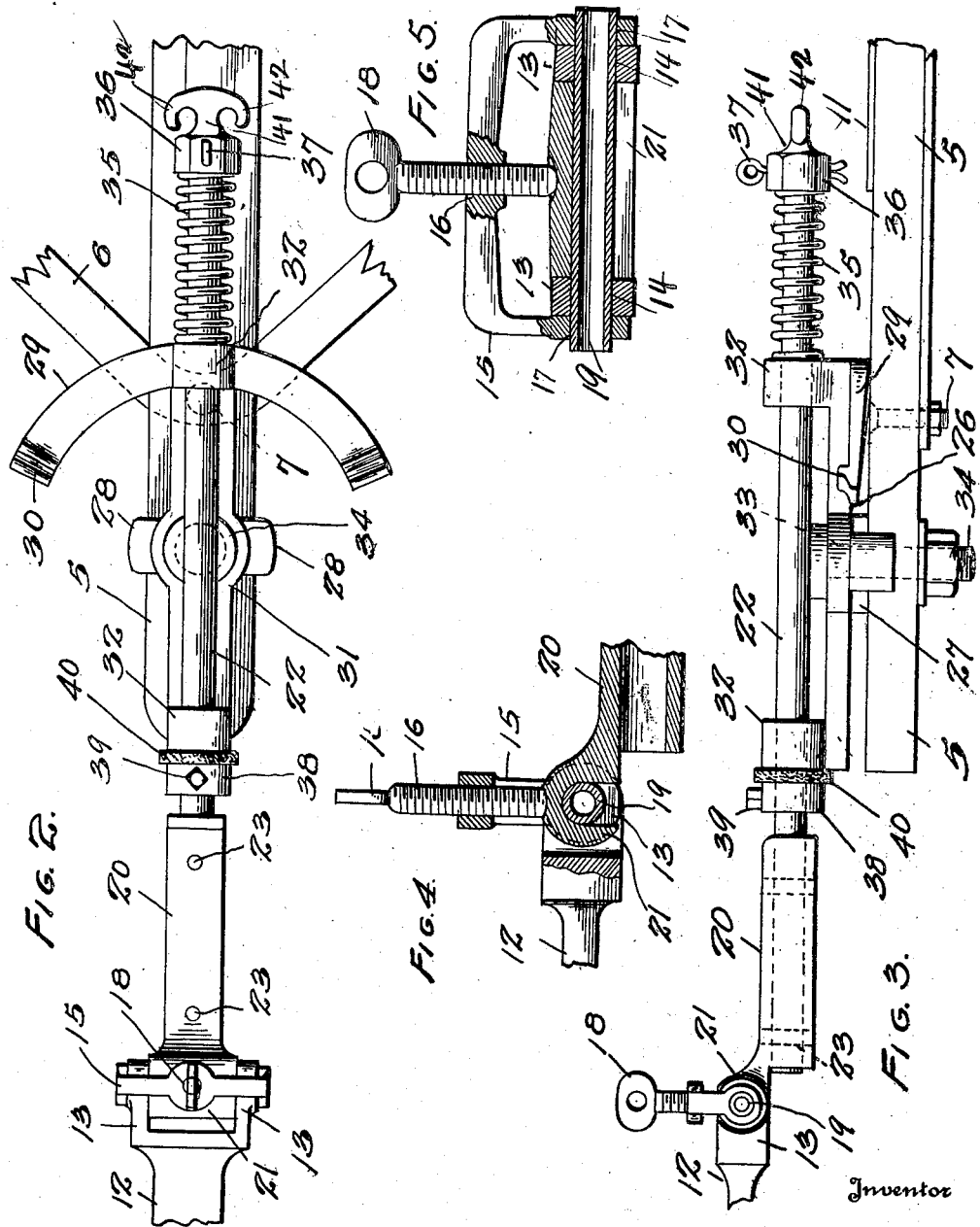

C. A. BEHLEN.
COUPLING AND DRAW BAR FOR AUTOMOBILES.
APPLICATION FILED JAN. 17, 1918.
1,313,451.
Patented Aug. 19, 1919.
3 SHEETS—SHEET 3.
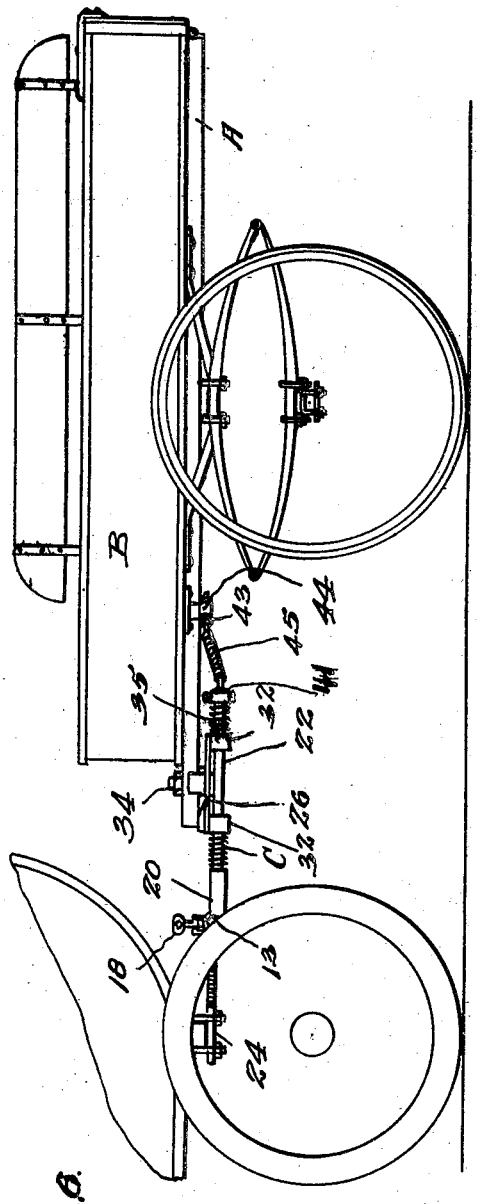
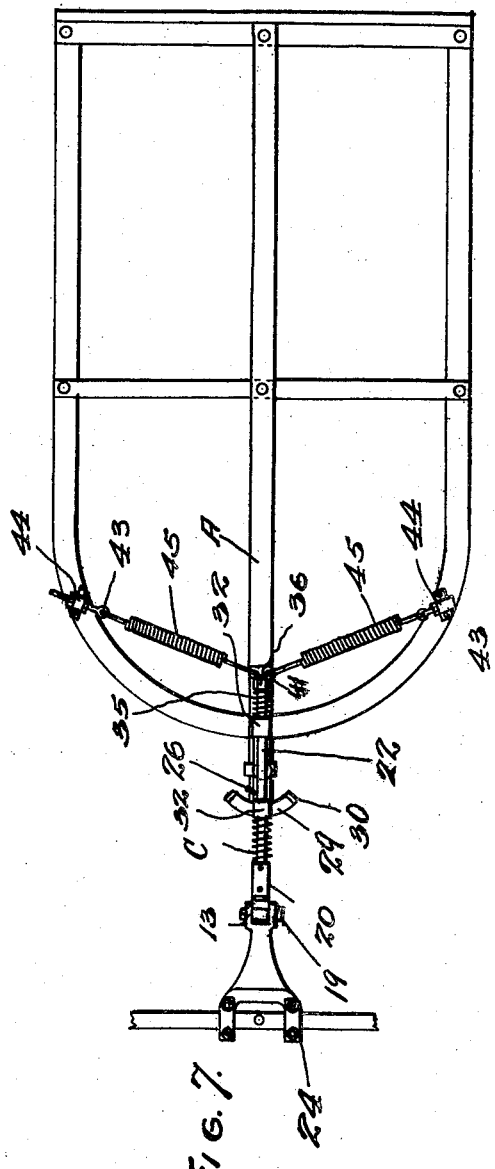
Inventor
Charles A. Behlen,
By F. E. Stebbins
Attorney

UNITED STATES PATENT OFFICE.

CHARLES A. BEHLEN, OF CINCINNATI, OHIO.

COUPLING AND DRAW-BAR FOR AUTOTRAILERS.

1,313,451.      Specification of Letters Patent.      Patented Aug. 19, 1919.

Application filed January 17, 1918. Serial No. 212,342.

*To all whom it may concern:*

Be it known that I, CHARLES A. BEHLEN, a citizen of the United States, residing at Cincinnati, in the county of Hamilton and State of Ohio, have invented certain new and useful Improvements in Coupling and Draw-Bar for Autotrailers, of which the following is a specification.

In towing auto trailers by an automobile it is desirable that the drawbar be provided with spring means for gradually transmitting energy to the trailer, with cushioning means to receive the thrust of the trailer when descending grades, with pivotal means to facilitate the passing of the trailer around curves and also to allow movements in vertical planes, and means for easily and quickly attaching the drawbar to and disconnecting it from the automobile. Further, as the trailer should be located close to the automobile, means should be provided for limiting the movements of the wheels of the trailer and the rear wheels of the automobile in turning curves within less than striking distances.

The object of my invention is the provision of a coupling and drawbar mechanism which in use will attain the ends hereinbefore set forth.

A further object is the provision of a drawbar mechanism which is held in position by springs, which springs when the drawbar is displaced on curves will return it to its normal position and prevent wabbling of the pole and front wheels of a four-wheeled trailer, and the bar, body and wheels of a two-wheeled trailer.

The invention consists in certain novelties of construction and the combination of parts as herein set forth and claimed.

The accompanying drawings illustrate two examples of the embodiment of the invention constructed and the parts relatively arranged according to the best methods of procedure I have so far devised for the purpose, one example disclosing the invention in connection with a four-wheeled trailer and the other applied in connection with a two-wheeled trailer.

Fig. 2 is an enlarged top plan view of the drawbar.

Fig. 3 is a side view in elevation of Fig. 2.

Fig. 4 is a sectional view of the coupling.

Fig. 5 is a cross sectional view of Fig. 4 taken adjacent to the thumb screw.

Figs. 6 and 7 illustrate the invention applied in connection with a two-wheeled trailer, Fig. 6 being a side view in elevation and Fig. 7 a bottom plan view.

Figure 1:
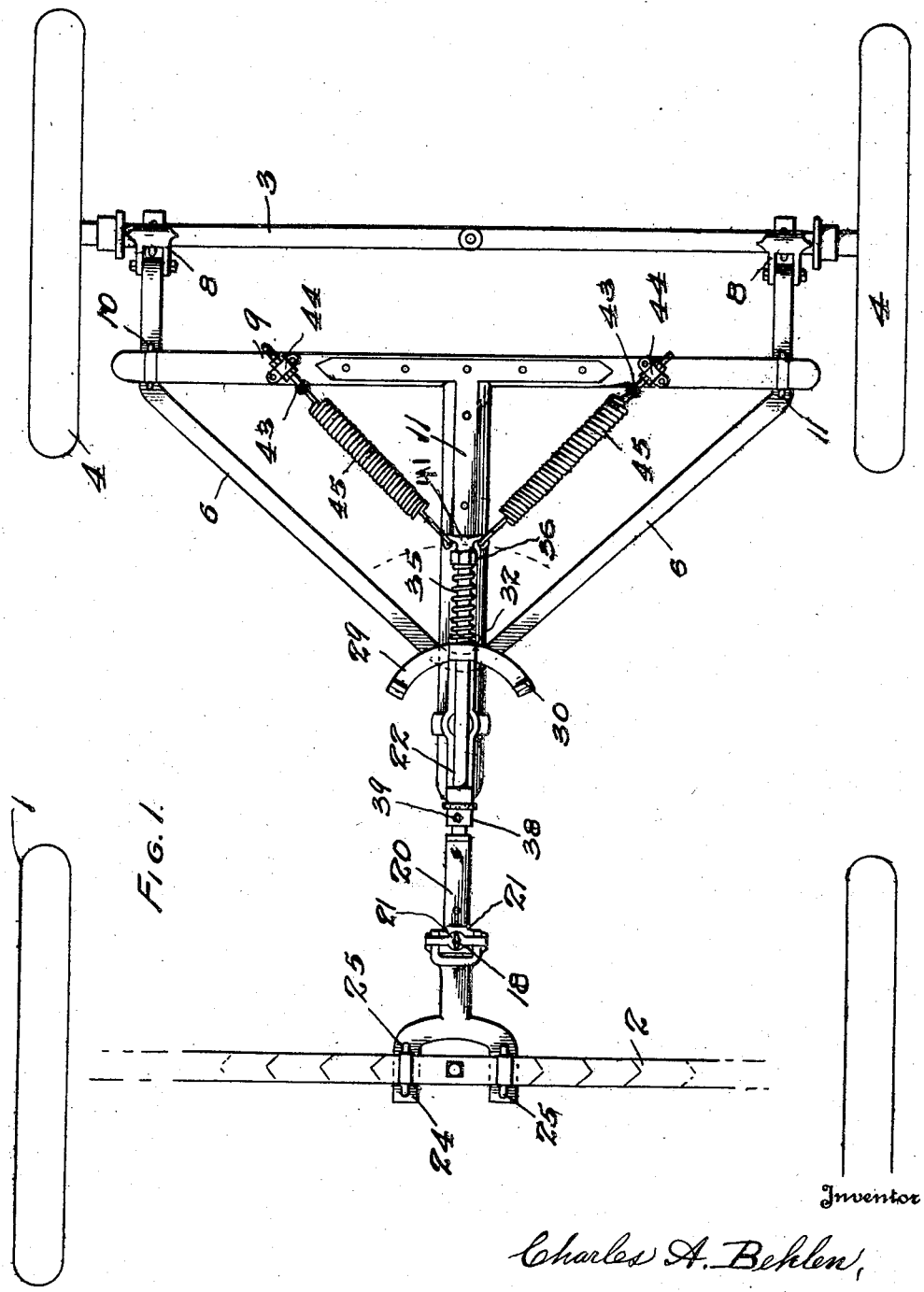
Figure 1 is a top plan view of the rear wheels and spring of an automobile, the front axle and wheels of a four-wheeled trailer, and the coupling and drawbar mechanism connecting the axle of the trailer with the spring of the automobile.

Referring to Figs. 1 to 5, inclusive, the numeral 1 designates the rear wheels of an automobile; 2, the rear semi-elliptic spring of a Ford automobile; 3, the front axle of a four-wheeled trailer; 4, the front pair of wheels; 5, the steering pole of the trailer pivotally connected to the front axle of the trailer through the medium of a V-shaped metallic bar 6 secured to the under surface of the pole by a bolt 7 and to the axles by the well known couplings 8, a crossbar 9 uniting the rear end of the pole with the ends of the bar 6 in front of the couplings by means of threaded U bolts 10, as shown. The union of the rear end of the pole with the crossbar may be reinforced by a metallic T plate 11, as indicated.

Obviously, the V-shaped bar constitutes thrust and tension elements and the bolt 7 a fulcrum for the pole when the latter is moved sidewise.

The coupling proper consists of a casting 12 having arms 13 with perforations 14; a pivotal yoke 15 with a threaded hole 16 and holes 17, 17; a threaded thumb screw 18; a bolt or tube 19 fixedly located within the perforations 14 and loosely within holes 17; and the casting 20 having a hook 21 at one end engaging the bolt or tube 19 and at the other end an opening to receive the pipe or rod 22 which is rigidly secured to the casting by rivets 23.

The casting 12 in front of the arm is extended and provided with suitable means for securing the same to an automobile. In this instance I have shown the extension provided with perforated arms 24. These arms are attached to the rear spring 2 of a Ford car by removing the nuts and yokes from the U bolts 25, passing the arms 24 over the ends of the bolts and replacing the nuts.

When the attachment is to be made to some other part of an automobile the extension must be constructed as occasion may be required.

The drawbar comprises the pipe or rod 22; the plate 26 having a bearing 27 with lugs 28 which engage over the edges of the pole and a curved movement limitation plate 29 with lugs 30; a supporting guide 31 for the tube 22 having perforated lugs 32 and a perforation 33; and a bolt 34 passed through the perforation 33, bearing 27 and pole, as shown.

The plate 26, bearing 27 and curved plate are integral and fixed relative to the pole end, and the supporting guide plate is movable about the bolt 34 as a center. A helical or other spring 35 is interposed between the lug 32 and a washer 36 at the end of the tube, the washer being held in place by a cotter pin 37. Preferably a washer 38 adjustably locked on the tube by a set-screw 39 is placed between the other lug 32 and the end of the casting 20 and a rubber or other buffer spring 40 interposed between the washer and the lug, as indicated. By the use of the washer 38 a tube or rod 22 of any desirable length may be employed to increase or lessen the distance between the rear wheels of the automobile and the front wheels of the trailer.

Obviously, in drawing the spring 35 is compressed and the energy gradually transmitted to the trailer both in starting and when the wheels of the trailer meet an obstruction on the roadbed. In descending grades the buffer spring 40 primarily receives and cushions the thrusts imparted by the load. In passing around curves a lug 30 on the movement limitation plate limits the distance between a rear wheel of the automobile and a front wheel of the trailer on the same side.

The coupling means provides for an easy and quick attachment of the trailer to and detachment from the automobile. To attach the drawbar the yoke is turned forwardly, the hook passed over the tube or rod, the yoke turned to a vertical position and the thumb nut screwed down so the end engages the recess or seat in the top surface of the hook, as shown in Figs. 4 and 5.

To prevent wabbling or pendulum movements of the pole and front wheels of a four-wheeled trailer, and the body and wheels of a two-wheeled trailer, springs are attached to the rear end of the pipe or rod 22 and the pole or body.

In this example a casting 41 having hooks 42 is secured to the end of the pipe or rod and adjustable means consisting of threaded eye bolts 43 and bearings 44 on the crossbar 9 are provided for the attachment of the ends of the spring. The springs 45 when properly adjusted prevent the wabbling motion and return the tube or rod to its central position.

Figs. 6 and 7 show the invention applied to a two-wheeled trailer. In this instance the central bar A projecting slightly beyond the body B serves the same purpose as the pole for the attachment of the drawbar which is here applied to the under surface of the bar, the plate 26 being reversed so the circle is at the front and the centering springs secured at their rear ends to the body of the trailer. The coupling is the same as that described in the first example.

On the tube 22 is a coiled buffer spring C bearing against the casting 20. The king bolt 34 is inserted from below with the nut at the top and the weight at the front is taken by the bolt and the plate 29.

The casting 41 with the hooks is the same as in the other example; however, the centering springs 45 are attached to the under surface of the body by threaded eye bolts 43 and bearings and nuts, as shown in Fig. 7, so the springs may be adjusted to varying tensions. This type of drawbar allows the trailer to occupy a position very close to the automobile body, and the plate 29 having the lugs limits the angular position of the trailer relative to the automobile body in passing around curves and corners, and the centering springs return the body to its normal position on a straight track and at the same time prevents any wabbling of the trailer as a whole.

It is clear from the drawings and description that I have provided a superior coupling and drawbar appliance for satisfactory use in towing both four-wheeled and two-wheeled trailers.

What I claim is:

1. The combination with a coupling formed in two detachable parts, of a drawbar, pivotal mechanism in connection with the drawbar which takes the strains in drawing, and tension springs adapted to center the coupling and drawbar when turned about the pivotal mechanism.

2. A coupling and drawbar for trailers having a detachable coupling, a drawbar provided with a draft spring which permits a forward movement of the drawbar, pivotal means connecting the drawbar with the trailer and taking the strains in drawing, and centering springs connected to the drawbar and adapted for attachment to the trailer.

3. A coupling and drawbar for trailers having a detachable coupling, a movement limitation plate and a drawbar both adapted to be attached to a trailer the drawbar being pivoted relative to the movement limitation plate, and centering springs connected to the drawbar and adapted for attachment to the trailer.

4. A coupling and drawbar for trailers including a detachable coupling and a drawbar comprising a plate with a movement limitation arc plate, a member, a supporting guide having bearings for the member and pivoted relative to the first mentioned plate, and a draw spring on the member.

5. A coupling and drawbar for trailers including a detachable coupling, and a drawbar comprising a plate with a movement limitation arc plate, a member, a supporting guide having bearings for the member and pivoted to the first mentioned plate, and buffer and draw springs on the member at opposite ends of the supporting guide.

6. A coupling and drawbar comprising a separable coupling, and a drawbar including a plate with a movement limitation arc, a supporting guide pivoted relative to said plate, and a member carried by the supporting guide.

7. A coupling and drawbar comprising a separable coupling, and a drawbar including a plate with a movement limitation arc, a supporting guide pivoted relative to said plate, a member carried by the supporting guide, and centering springs secured to the drawbar and adapted to be secured to the trailer.

8. The combination of a detachable coupling comprising a casting having perforated arms, a pivotal yoke with a threaded hole and holes for a connecting element, a connecting element uniting the parts, and a thumb screw; a casting 20 having a hook at one end and a hole to receive a member 22 at the other end; and a drawbar mechanism including the member 22 and a bearing to which said member is pivoted so the drawbar may turn in a horizontal plane.

9. The combination of a coupling having horizontal pivotal means including a vertical bolt, as 34, adapted to be secured to a trailer, means for connecting the coupling to a vehicle consisting of a casting 12 having perforated arms 13 for attachment, arms 24 and U-shaped bolts located within perforations in said latter arms, a yielding drawbar having vertical pivotal means including the horizontally disposed bolt 19 connecting the arms 13 with its drawbar, and means for connecting the drawbar with the bolt 34 and also means for pivotally connecting the same with the arms 13, 13.

10. A drawbar comprising a member having a casting with means for attachment as a hook at one end, a plate 26 with a bearing 27, a supporting guide 31 having perforated lugs located at one side of the plate 26, means for pivoting the guide to the plate, said member being located within the perforations of the lugs of the supporting guide, and draft and buffing springs on the member.

11. The combination of a detachable coupling, a yielding pivotal drawbar, means for connecting the coupling to a power vehicle, means for connecting the drawbar with a trailer, and means consisting of a plate 29 with lugs 30 for limiting the horizontal movement of the drawbar when the power vehicle travels in a curved path.

12. The combination of a detachable coupling, a yielding drawbar in connection with the coupling, means for pivoting the drawbar to a part of the trailer, as pole 5, said means being movable with the drawbar, and two springs positively attached to the trailer and at their opposite ends positively attached to the drawbar and the means by which the drawbar is pivoted to the pole, said springs being adapted to return the drawbar to a central position when moved sidewise.

13. The combination of a detachable coupling comprising a casting having perforated arms, a pivotal yoke with a threaded hole and holes at the sides, a thumb screw, and a bolt member; also a casting provided with a hook at one end and a perforation to receive a draw member at the other end, means for securing the detachable coupling to a vehicle, a yielding drawbar mechanism including the said draw member in connection with the coupling, said drawbar having a vertical pivot permitting horizontal movements of the coupling, and means for connecting the drawbar with the trailer.

14. The combination of a coupling having intermediate its ends separable horizontal pivotal means, means for connecting the coupling to a vehicle consisting of a metallic member having perforated arms to receive U-shaped bolts, located within perforations in said arms, a yielding drawbar secured to the coupling and having vertical pivotal means, and means for connecting the drawbar with a trailer.

15. The combination of a coupling having horizontal pivotal means, means for connecting the coupling to a vehicle, a yielding drawbar mechanism comprising a pole plate with a bearing, a supplemental guide having perforated lugs within which is the said drawbar, a bolt uniting the pole plate and supplemental guide, said drawbar having springs located at opposite ends outside the perforated lugs, and means for connecting the drawbar with a trailer.

16. A drawbar comprising a member having a casting with a hook at one end, a pole with a perforation adjacent one end, and means for attaching the same to a trailer at the other end, a plate with a bearing in connection with the pole, a supporting guide having perforated lugs located one side of the plate, a bolt passed through the supporting guide plate and the pole providing a pivotal connection, and two springs, said member with the hook being located within the perforated lugs of the supporting guide and the springs upon the tube or rod and suitably spaced to constitute a draft spring and a buffing spring.

17. A combined coupling and pivotal drawbar having a member, means for connecting the coupling to a vehicle, and means for connecting the drawbar with a trailer; the coupling comprising a casting having a hook at one end and an opening at the other to receive the end of the member, a horizontal member which the hook engages, a pivotal yoke, and a thumb screw carried by the yoke and adapted to bear upon the hook.

18. A combined coupling and pivotal drawbar, means for connecting the drawbar to a power vehicle, the drawbar comprising a plate having a bearing and lugs which engage over a pole or support, a guiding plate having perforated lugs, a member within the perforations of the lugs, a spring to take the strains in drawing, a bolt uniting the supporting guide, plate and support, and means for connecting the support with a trailer.

19. The combination of a detachable coupling, a yielding pivotal drawbar, means for connecting the coupling with a power vehicle, means for connecting the drawbar with a trailer, and means for limiting the horizontal movement of the drawbar when the power vehicle travels in a curved path consisting of a plate supporting a plate having lugs.

In testimony whereof I affix my signature.

CHARLES A. BEHLEN.